United States Patent [19]
Gennow

[11] 3,738,431
[45] June 12, 1973

[54] SOD CUTTER CUTOFF BLADE MOUNTING
[75] Inventor: Robert A. Gennow, St. Paul, Minn.
[73] Assignee: Outboard Marine Corporation, Waukegan, Ill.
[22] Filed: Apr. 12, 1971
[21] Appl. No.: 133,039

[52] U.S. Cl. .................................. 172/20, 172/101
[51] Int. Cl. ............................................ A01b 45/04
[58] Field of Search ................... 172/20, 19, 101; 146/131, 138, 484

[56] References Cited
UNITED STATES PATENTS

| | | | |
|---|---|---|---|
| 2,942,674 | 6/1960 | Ditter et al. | 172/20 |
| 2,614,477 | 10/1952 | Habenight | 172/20 |
| 2,872,989 | 2/1959 | Hadfield | 172/20 |
| 2,987,124 | 6/1961 | Hadfield | 172/20 |
| 2,778,292 | 1/1957 | Kavan | 172/20 |
| 3,387,666 | 6/1968 | Hadfield | 172/20 |
| 3,061,059 | 10/1962 | Kindlien et al. | 192/18 R |

Primary Examiner—Robert E. Pulfrey
Assistant Examiner—Stephen C. Pellegrino
Attorney—Robert E. Clemency, John W. Michael, Gerrit D. Foster, Bayard H. Michael, Paul R. Puerner and Joseph A. Gemignani

[57] ABSTRACT

Disclosed herein is a sod cutter including a parallel linkage pivotally mounting a generally planar transverse cutoff blade on a frame such that the blade is movable into and out of the ground in response to travel of the cutter along the ground, such that the angular relation of the blade to the frame is constant during movement into and out of the ground, and such that the blade moves downwardly and rearwardly relative to the frame during movement of the blade into the ground, and such that the blade moves upwardly and forwardly relative to the frame during movement of the blade out of the ground.

7 Claims, 3 Drawing Figures

3,738,431

Inventor
Robert A. Gennow
By Robert E. Clemency
Attorney

SOD CUTTER CUTOFF BLADE MOUNTING

BACKGROUND OF THE INVENTION

The invention relates generally to sod cutters and more particularly to sod cutters which include a transverse cutoff blade operable to initiate a sod roll, together with mechanism for completing the rolling of a sod roll. Examples of such sod cutting and rolling apparatus are found in the Hadfield U.S. Pat. No. 2,987,124 issued June 6, 1961, and No. 3,387,666 issued June 11, 1968, as well as in the Schuman U.S. Pat. No. 3,557,878 issued Jan. 26, 1971.

In the structure disclosed in the Hadfield U.S. Pat. No. 2,987,124 (especially the embodiment of FIGS. 7 and 9) and in the structure disclosed in the Hadfield U.S. Pat. No. 3,387,666, the transverse cutoff blade is employed to initiate a sod roll. Such initiation is caused, as the sod cutter is moving forwardly and while the blade is moving upwardly from the fully extended position in the ground, by generally restricting the blade from material rearward pivotal movement and thereby causing the cutoff blade to plow the cut sod forwardly into the beginning of a roll. Restricting the cutoff blade against material rearward pivotal movement while the blade is in the ground and as the machine is moving forwardly, places a severe structural strain on the frame of the sod cutter, and in particular, severe strain and wear is experienced by that portion of the frame which supports the cutoff blade.

The structure disclosed in the drawings of the Rothi application Ser. No. 797,972 filed Feb. 10, 1969, attempts to relieve the problem of wear on the cutoff blade supporting portion of the frame by permitting the cutoff blade to swing rearwardly during upward cutoff blade movement as the cutter advances and by employing spring fingers carried with the cutoff blade for initiating the sod roll.

SUMMARY OF THE INVENTION

The invention provides a sod cutter including a transverse cutoff blade operably mounted such that the blade is moved into and out of the ground in response to travel of the sod cutter along the ground and along an arcuate path without changing the angular relationship of the cutoff blade to the frame. The mounting is such that the cutoff blade moves downwardly and rearwardly relative to the frame during movement of the blade into the ground and such that the cutoff blade moves upwardly and forwardly relative to the frame during movement of the blade out of the ground.

More particularly, the invention provides for mounting the cutoff blade by a parallel linkage and for oscillating one of the links (and therefor the linkage and the blade) in response to travel of the sod cutter over the ground so as to move the cutter blade downwardly and rearwardly relative to the frame during movement of the blade into the ground and so as to move the cutter blade upwardly and forwardly relative to the frame during movement of the cutter blade out of the ground. It is to be understood that while the blade is moving into and out of the ground, the sod cutter, as a whole, is also traveling forwardly relative to the ground.

The linkage is oscillated by a one revolution clutch cooperating with an eccentric drive including a drive member which is connected to the linkage and which, in general, reciprocates once for each output revolution of the clutch to oscillate the linkage and to move the cutoff blade between its fully retracted position spaced from the ground and its fully extended position in the ground.

Movement of the blade rearwardly relative to the frame as the blade moves downwardly through the soil to transversely sever the sod as the frame simultaneously moves forwardly has the advantage of, at least partially, avoiding plowing during movement of the blade into the ground and thereby reducing the application of undesirable stresses to the frame consequent to plowing action prior to complete transverse severance of the previously stripped sod.

Movement of the cutoff blade forwardly relative to the frame as the blade moves upwardly out of the ground after transverse severing of the sod strip and during forward movement of the cutter over the ground has the advantage of assisting in flipping the end of the sod length over to initiate a roll.

The principal object of the invention is the provision of a sod cutter including a transverse cutoff blade which moves downwardly and rearwardly into the ground as the sod cutter move forwardly to transversely sever a strip of sod and which moves upwardly and forwardly from its extended position to flip over the end of the cut sod so as to intiate a sod roll.

Another of the principal objects of the invention is the provision of a sod cutter which employs a transverse cutoff blade to sever a sod strip and to initiate a sod roll in such manner as to reduce wear and structural damage to the cutter.

Another of the principal objects of the invention is the provision of a sod cutter including a transverse blade mounting arrangement which will provide reliable service over a long and useful life.

Other objects and advantages of the invention will become known by reference to the following description and accompanying drawings.

DRAWINGS

GENERAL DESCRIPTION

Figure 1:
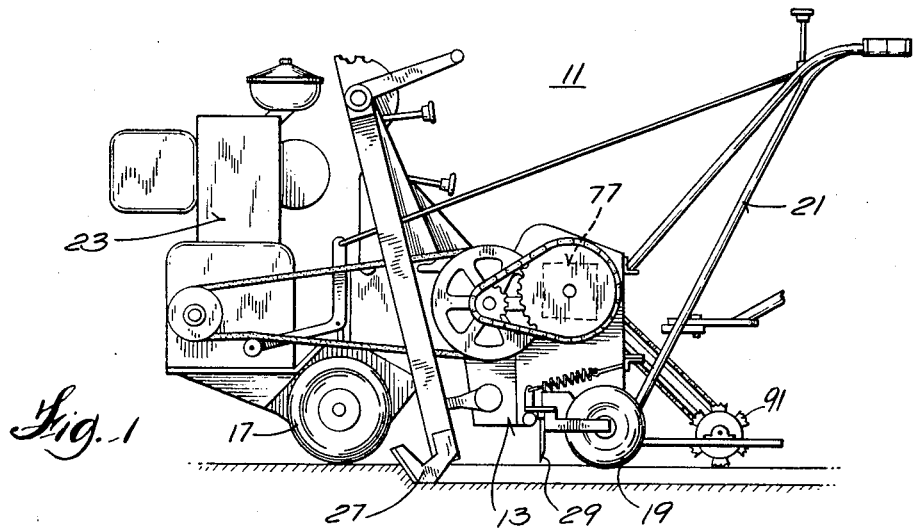
FIG. 1 is a side elevational view of a sod cutter embodying various of the features of the invention.

Shown in FIG. 1 is a sod cutter 11 which includes a frame 13 supported at the front by a traction wheel 17 and supported at the rear by a transversely spaced pair of wheels 19. The sod cutter 11 can be guided for travel over the ground by a handle structure 21 mounted on the frame 13.

Supported on the frame 13 is an internal combustion engine 23 which, through a suitable drive arrangement, powers the traction wheel 17 and also drives a generally horizontally reciprocable sod stripping blade 27 operable to cut a ribbon or elongated strip of sod.

The sod cutter 13 also includes a generally planar transverse cutoff knife 29 which is movable between a retracted position spaced from the ground and an extended position in the ground to effect transverse severance of the sod ribbon into pieces of predetermined length. The transverse cutoff knife 29 also operates to initiate a sod roll which is completed by a mechanism located to the rear of the transverse cutoff knife and which, in general, is not shown. Various arrangements can be employed for completing the rolling of the sod. One such arrangement is disclosed in the Hadfield U.S. Pat. No. 3,387,666 and another arrangement is disclosed in the Schuman U.S. Pat. No. 3,557,878.

In accordance with the invention, means are provided for mounting the cutoff blade 27 on the frame 13 such that the cutoff blade 27 is movable into and out of the ground in response to travel of the frame 13 along the ground and along an arcuate path without changing the angular relation of the cutoff blade 27 to the frame 13. While various arrangements can be employed, in the disclosed construction, the cutoff blade 27 is secured, by suitable bolts 30, to a forked lower end portion 31 of a cutoff blade holder 33. In turn, the holder 33 is supported from the frame 13 by a parallel linkage 37 including upper and lower parallel links or rocker arms 39 and 41, respectively, which rocker arms are, respectively pivotally mounted (See FIG. 2) at 43 and 47 to a portion 49 of the frame 13 and which are respectively pivotally mounted at 51 and 53 to the cutoff blade holder 33.

More particularly with regard to the lower rocker arm 41 (See FIG. 3), the forked lower end portion 31 of the cutoff holder 33 includes a pair of transversely spaced legs 57 which receive a transverse pin 59 extending through a cross bore at the forward end of the lower rocker arm 41. At its rearward end, the lower rocker arm 41 includes a transversely elongated portion 63 having a transverse bore receiving a stud or pin 67 supported in a transversely spaced pair of legs 69 of a channel member 71 fixed to the frame 13.

Figure 2:
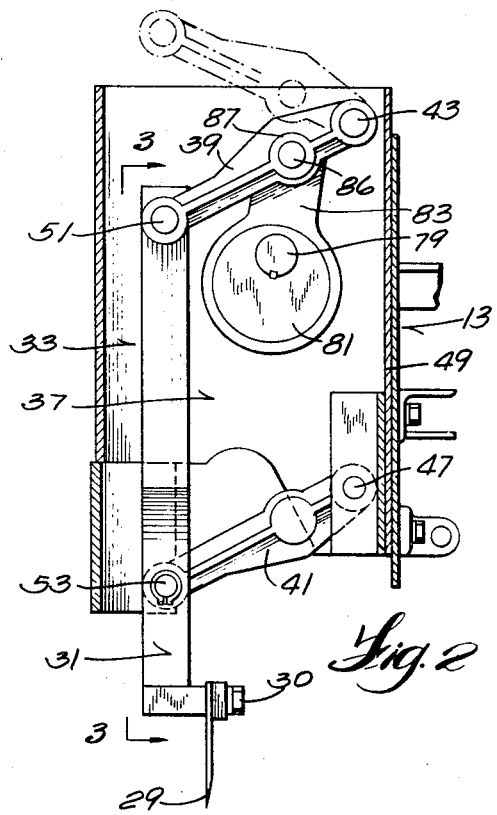
FIG. 2 is a view, partially in section, of a portion of the mechanism included in the sod cutter shown in FIG. 1.

The cutoff blade holder 33 extends, at its upper end, into a groove between spaced bosses 73 at the forward end of the upper rocker arm 39. The cutoff blade holder 33 is pivotally connected to the bosses as indicated in FIG. 2 at 51. In turn, the rearward end of the upper rocker arm 39 is pivotally supported by the frame 13 as indicated in FIG. 2 at 43.

Means are connected to one of the rocker arms 39 and 41 for oscillating the linkage 37 relative to the frame 13 in response to travel of the sod cutter 11 along the ground and so as to move the cutoff blade 29 into and out of the ground. While other arrangements can be employed, in the disclosed construction, such means includes a one revolution clutch 77 (shown in dotted outline in FIG. 1), which clutch 77 is supported by the frame 13 and drivingly connected to the engine 23 by suitable means. While other types of clutches can be employed, the disclosed construction contemplates a clutch of the type disclosed in the Kindlein U.S. Pat. No. 3,061,059 issued Oct. 30, 1962, which patent is incorporated herein by reference.

Figure 3:
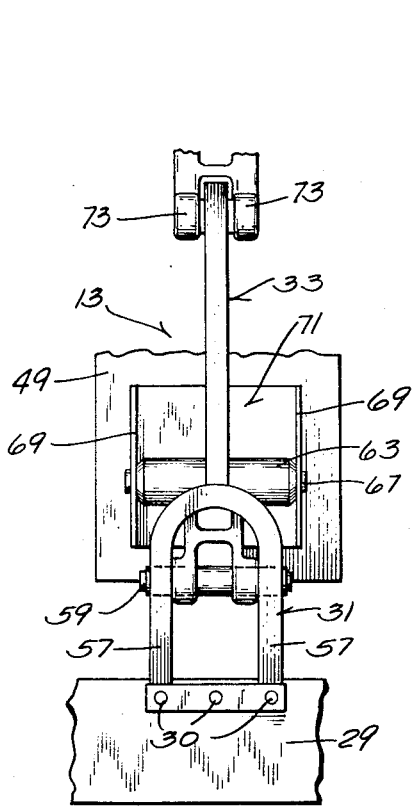
FIG. 3 is a fragmentary view taken generally along line 3—3 of FIG. 2.

More specifically, as shown in FIG. 3 of the drawings, the clutch 77 includes an output shaft 79 (referred to by numeral 10 in FIG. 1 of the Kindlein patent), which shaft 10 has fixed thereto an eccentric drive including an eccentric (referred to by the numeral 21 in FIG. 1 of the Kindlein patent), which eccentric 81 is received within a bore of a pitman or drive member 83 (referred to by the numeral 43 in FIG. 1 of the Kindlein patent). In turn, the drive member 83 is, at its upper end, pivotally connected at 86 to an intermediate portion 87 of the upper rocker arm 39 (referred to by the numeral 44 in FIG. 1 of the Kindlein patent). It will be further noted that the Kindlein fulcrum pin 45 (shown in FIG. 3 of the Kindlein patent) corresponds to the pivotal connection 43 disclosed herein between the upper rocker arm 39 and the frame 13 and that the Kindlein bearing member 47 (shown in FIG. 3 of the Kindlein patent) corresponds to the pivotal connection 51 disclosed herein between the upper rocker arm 39 and the upper end of the cutoff blade holder 33.

The one-way clutch 77 is tripped or caused to operate by reason of the travel over the ground of a metering wheel 91 (See FIG. 1) which is connected to the clutch 77 in a conventional manner so as to cause clutch operation which effects transverse sod severance by the cutoff blade 29 into sod pieces of uniform length. The one-way clutch 77 and its connection to the engine 23 and to the metering wheel 91, together with the eccentric 81, the pitman 83, and the upper rocker arm 39 have been commercially employed in the past.

However, in accordance with the invention, the connection of the pitman or drive link 83 to the upper rocker arm 39 and the support of the cutoff blade holder 33 by the parallel linkage 37 including both the upper rocker arm 39 and the lower rocker arm 41 causes the cutoff blade 29 to be maintained at the same angular relation to the frame 13 during movement of the cutoff blade 29 between its retracted and extended positions. In addition, the parallel linkage 37 and the connection of the pitman or drive link 83 to the intermediate portion 87 of the upper rocker arm 39 causes the cutoff blade 29 to move somewhat forwardly relative to the frame 13 during initial downward movement from the fully retracted position. However, before the cutoff blade 29 enters the ground, the cutoff blade 29 begins to move rearwardly relative to the frame and continues such rearward and downward movement during penetration into the ground to sever the sod strip while the frame is continuously moving forwardly. Such rearward blade movement during forward sod cutter travel serves to reduce the shock and stress to which sod cutters have otherwise been subject when employing a cutoff blade to initiate a sod roll.

Upon upward movement of the cutoff blade 29 from its lowermost or extended position, the cutoff blade 29 moves forwardly relative to the frame 13 and assists in plowing or flipping over the end of the sod so as to initiate a sod roll.

Various of the features of the invention are set forth in the following claims.

What is claimed is:

1. As sod cutter comprising a frame, means for movably supporting said frame for travel over the ground, means on said frame for stripping a ribbon of sod in response to travel of said frame along the ground, a cutoff blade adapted to transversely sever the sod ribbon in response to movement of said blade into the ground, (and) means movably mounting said blade on said frame (such that said blade is movable into and out of the ground in response to travel of said frame along the ground and) for travel along an arcuate path without changing the angular relation of said blade to said frame, and means on said frame and connected to said blade for moving said blade back and forth along said path and into and out of the ground in response to travel of said frame along the ground.

2. A sod cutter in accordance with claim 1 wherein said means movably mounting said blade on said frame is such that said blade moves downwardly and rearwardly relative to said frame during movement of said blade into the ground.

3. A sod cutter in accordance with claim 1 wherein said means movably mounting said blade on said frame is such that said blade moves upwardly and forwardly relative to said frame during movement of said blade out of the ground.

4. A sod cutter in accordance with claim 1 wherein said means mounting said blade on said frame comprises a pair of parallel links pivotally connected to said blade and to said frame, and wherein said blade moving means is connected to one of said parallel links for oscillating said link relative to said frame in response to travel of said frame along the ground and so as to move said cutoff blade into and out of said ground.

5. A sod cutter in accordance with claim 4 wherein said blade moving means comprises a one-way clutch including an eccentric drive comprising a member pivotally connected to said one link.

6. A sod cutter comprising a frame, means for movably supporting said frame for travel over the ground, means on said frame for stripping a ribbon of sod in response to travel of said frame along the ground, a cutoff blade adapted to transversely sever the sod ribbon in response to movement of said blade into the ground, a pair of parallel links pivotally connected to said blade and to said frame, a one revolution clutch mounted on said frame and including an output shaft, an eccentric fixed to said output shaft, and a drive member receiving said eccentric and drivingly connected to one of said parallel links intermediate the ends thereof such that, in response to travel of said frame along the ground, operation of said clutch causes oscillation of said parallel links and said cutoff blade so as to move said blade into and out of the ground and along an arcuate path without changing the angular relation of said blade to said frame and so that said blade moves downwardly and rearwardly relative to said frame during movement of said blade into the ground and so that said blade moves upwardly and forwardly relative to said frame during movement of said blade out of the ground.

7. A sod cutter in accordance with claim 1 wherein said means movably mounting said blade on said frame is such that said blade moves downwardly and rearwardly relative to said frame during movement of said blade into the ground and such that said blade moves upwardly and forwardly relative to said frame during movement of said blade out of the ground.

* * * * *